FIG. 6
FIG. 6a
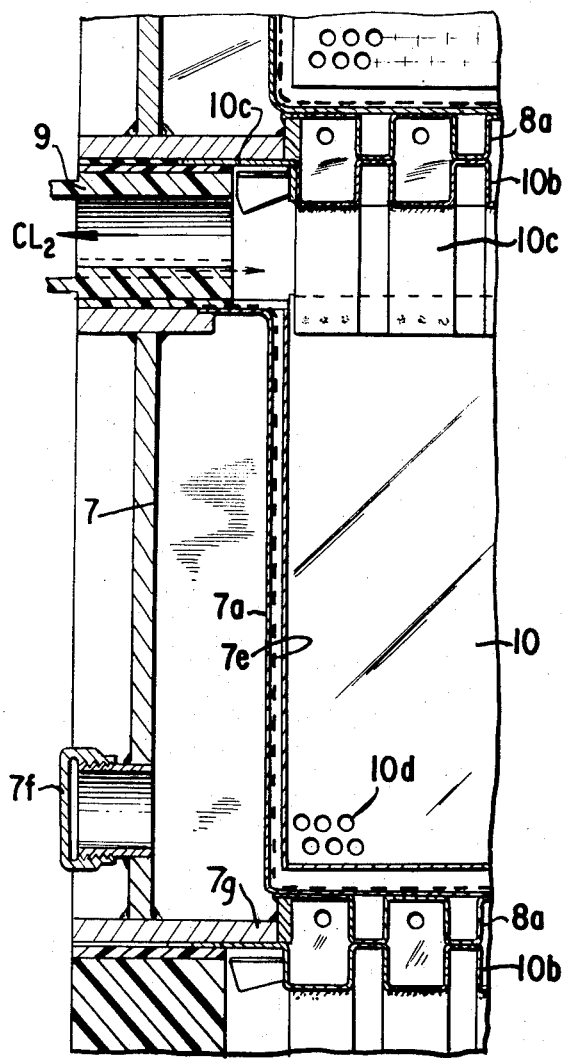
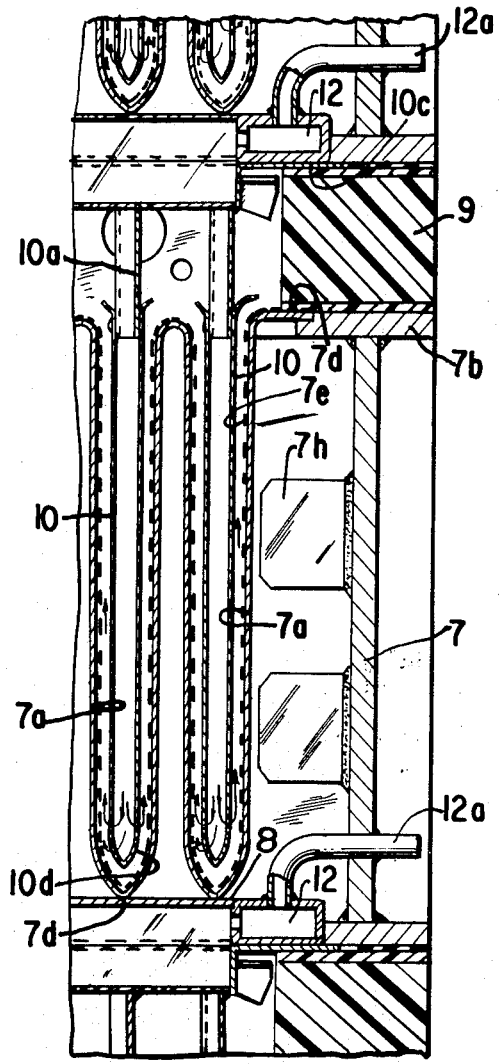

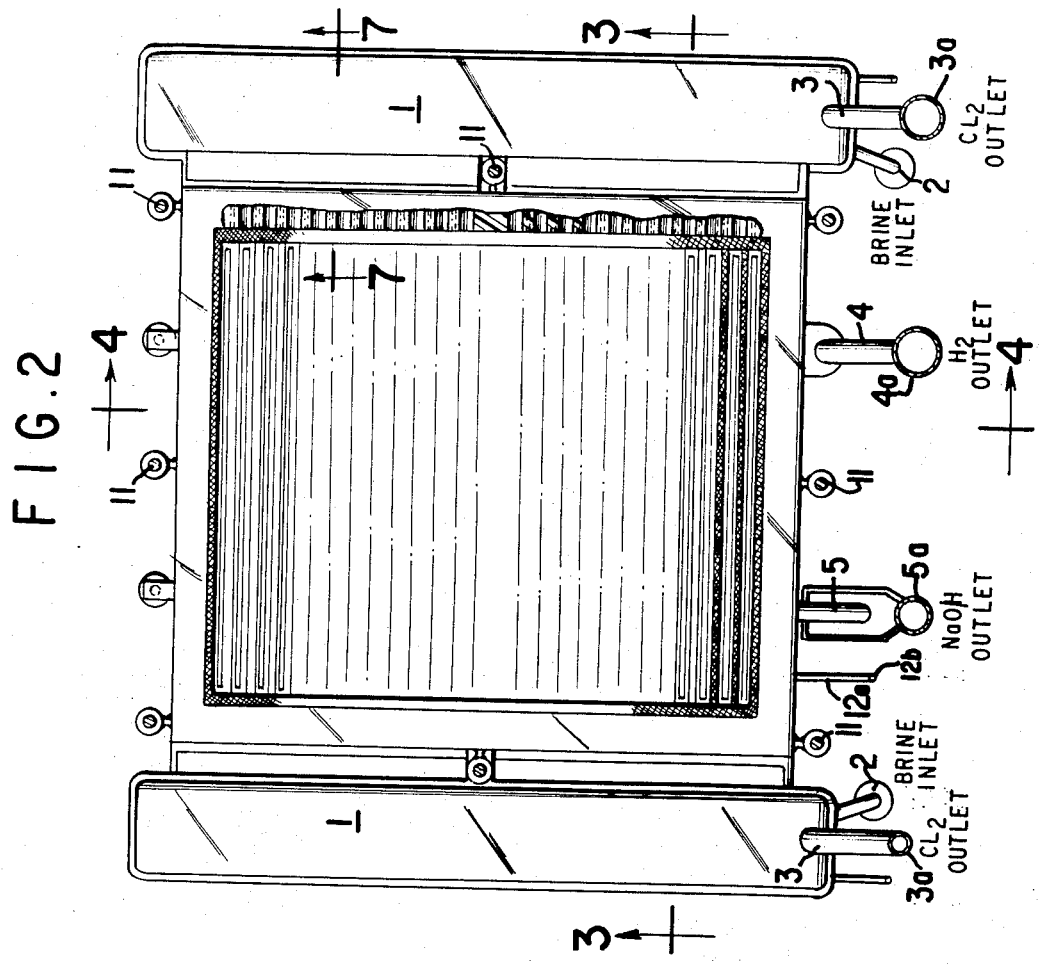
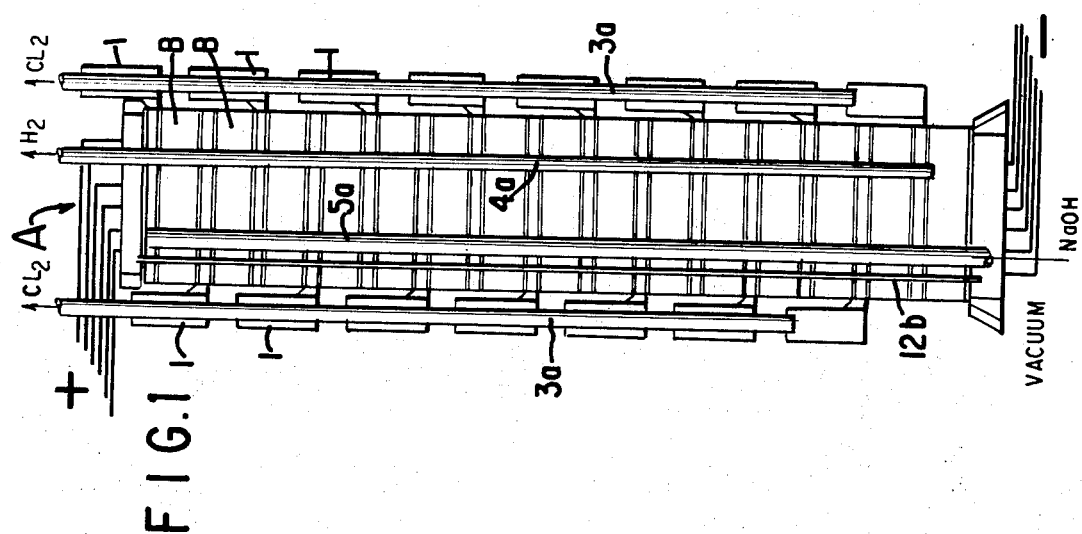

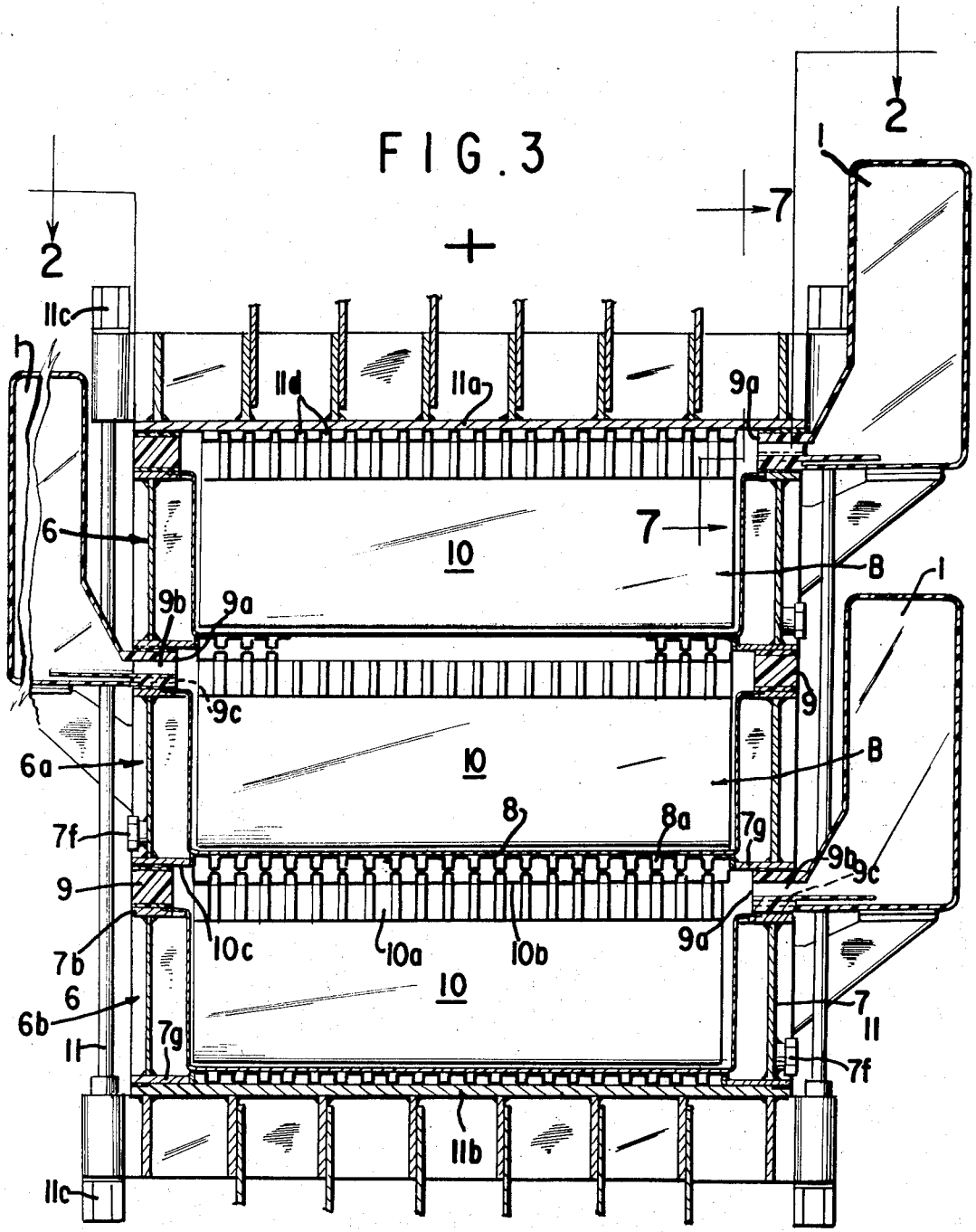

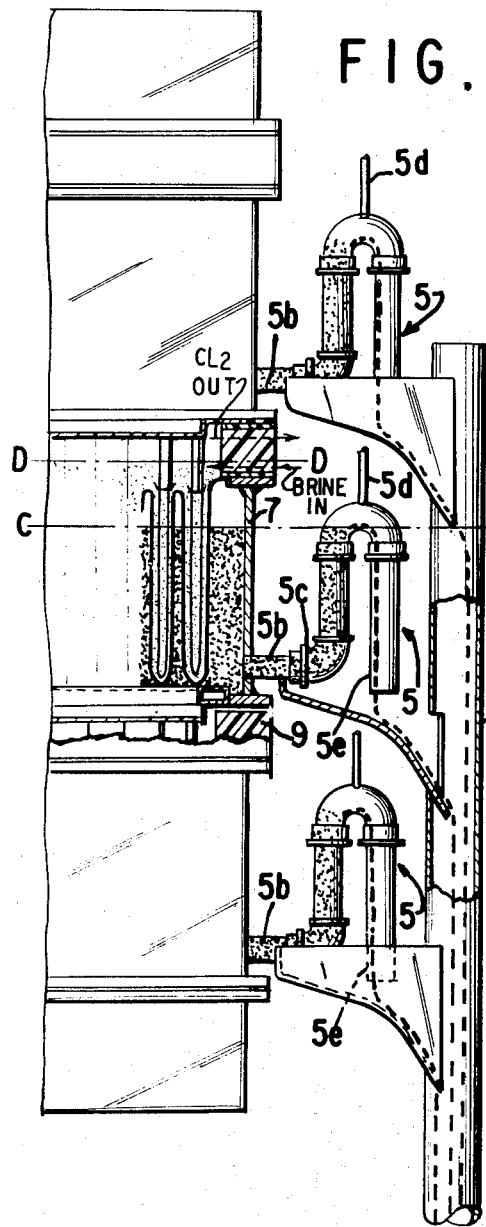
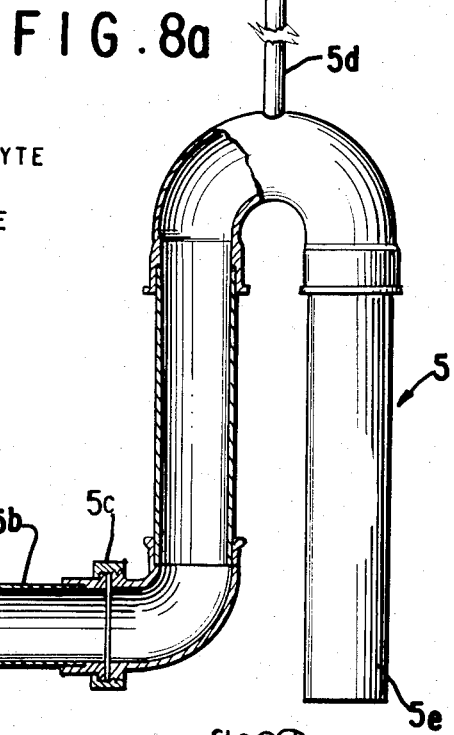
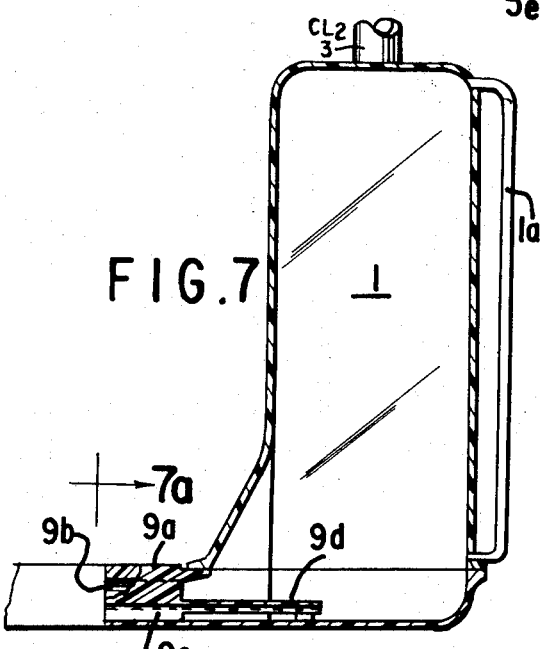
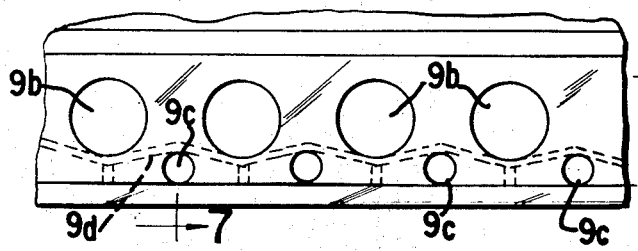

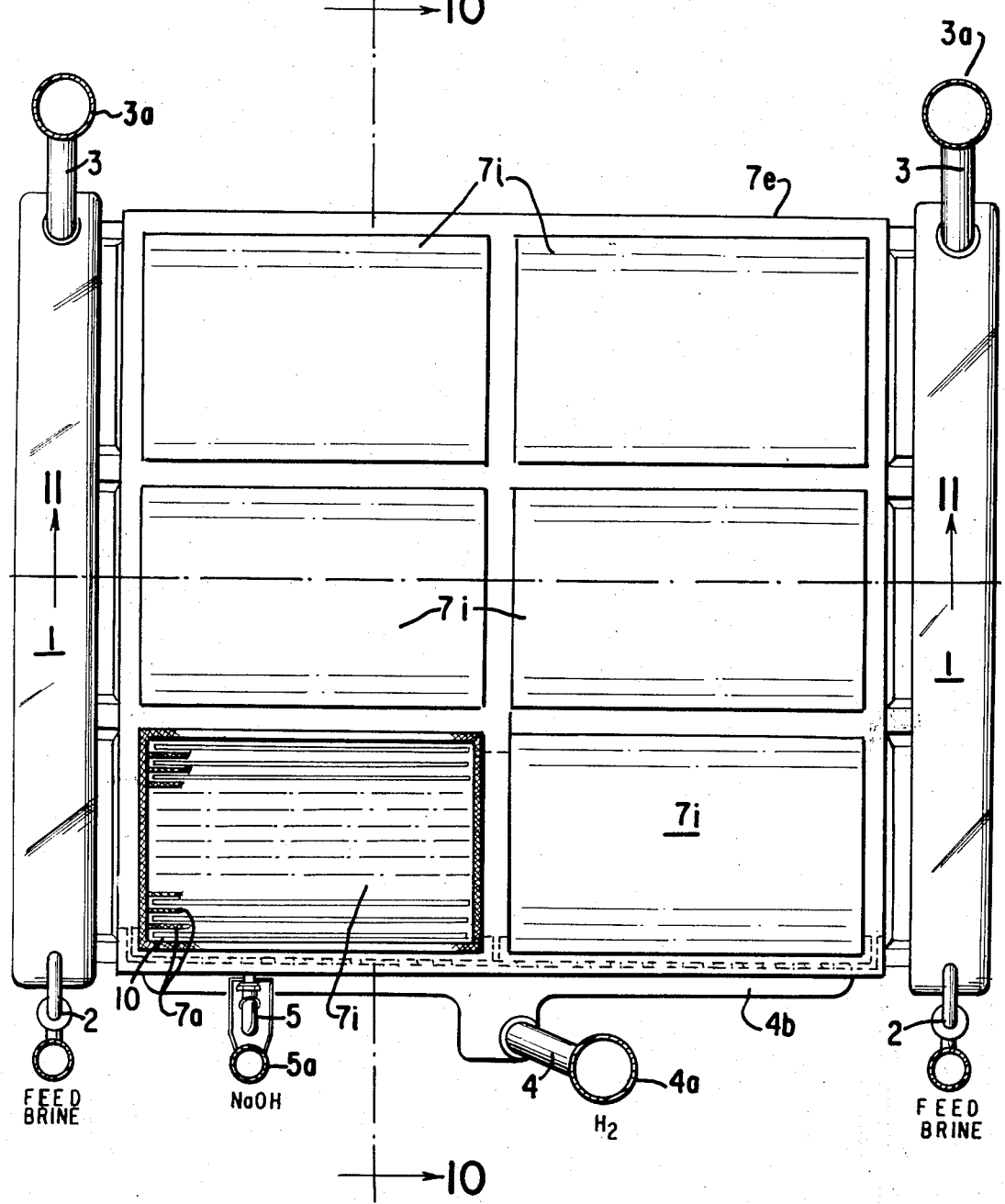

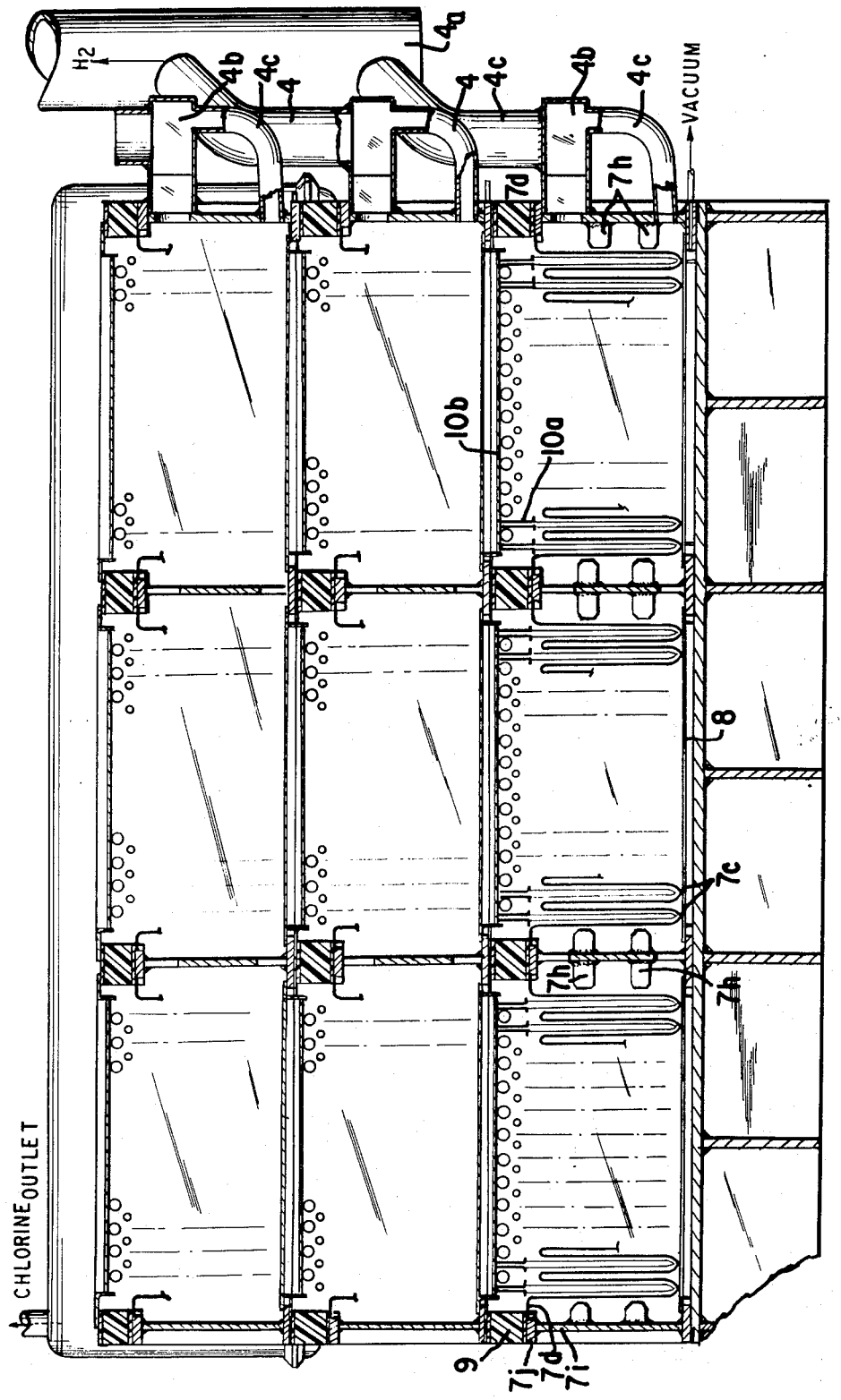

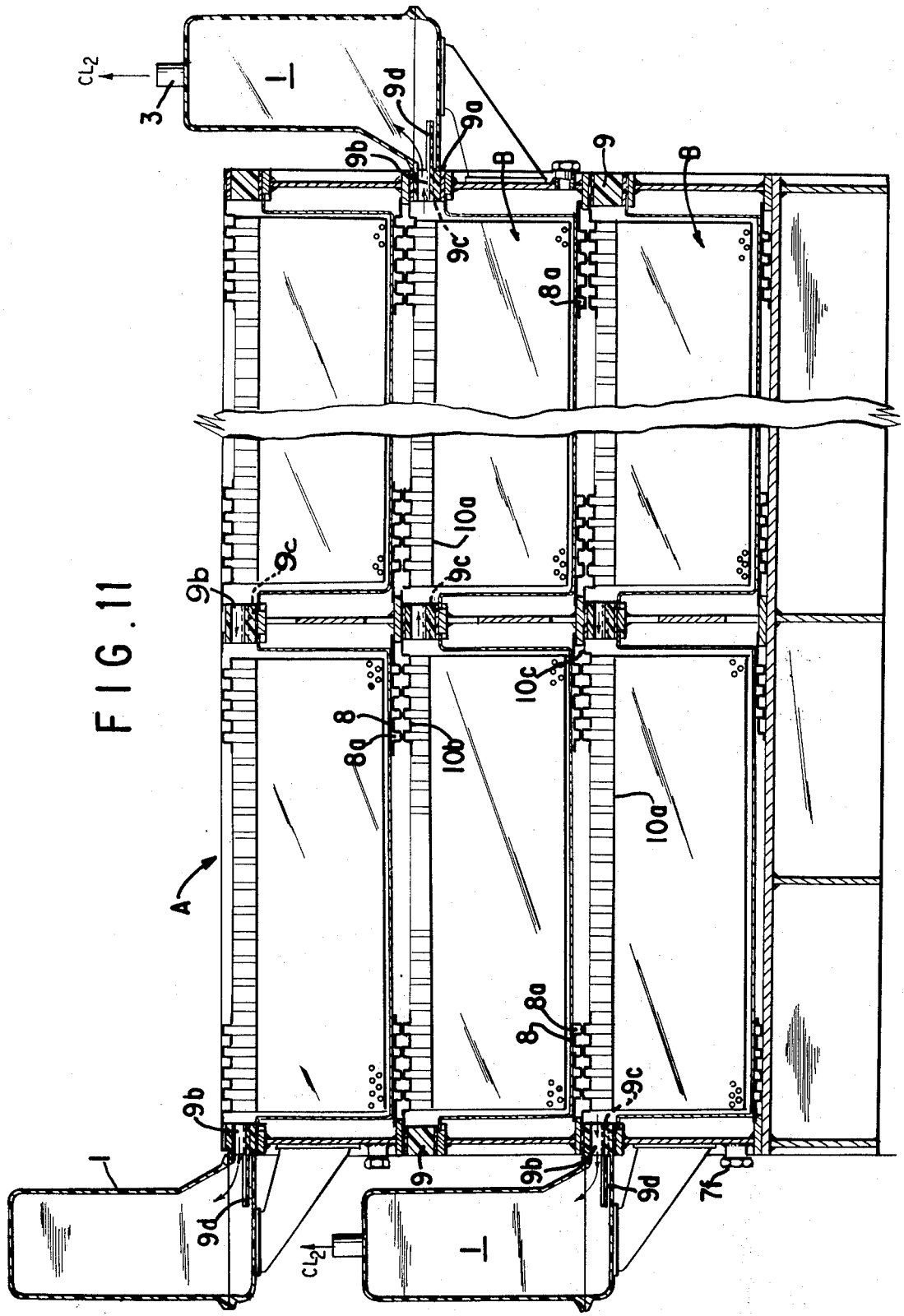

United States Patent Office
3,832,300
Patented Aug. 27, 1974

3,832,300
BIPOLAR DIAPHRAGM ELECTROLYZER WITH CATHODE WAVES IN HORIZONTAL PLANE
Georg Messner, 7 Latemar Strasse, 8000 Munich, 90, Germany, Oronzio de Nora, Piazza della Repubblica 19, Milan, Italy, and Vittorio de Nora, Sandringan House, Nassau, Bahama Islands
Filed Oct. 3, 1972, Ser. No. 294,034
Claims priority, application Italy, Nov. 9, 1971, 30,858/71
Int. Cl. B01k 3/10
U.S. Cl. 204—256
20 Claims

ABSTRACT OF THE DISCLOSURE

Describes a bipolar electrolysis cell with diaphragm covered steel cathodes in wave form mounted substantially horizontally in cathode frames and with dimensionally stable valve metal anode blades or waves extending into each of the cathode waves and forming an electrolysis gap therebetween, and bipolar connections between the valve metal anode supporting plates and the steel cathode wave supporting plates.

---

This invention relates to bipolar diaphragm electrolysis cells using dimensionally stable electrodes with the cathodes in wave form, with the waves in horizontal position and either double or single anode blades mounted horizontally and extending into the trough of each cathode wave with the electrolysis gap therebetween.

Cells of this type are used in the electrolysis of aqueous solutions of alkali metal halides and for other electrolysis processes. As a specific example, the invention will be described for use in the electrolysis of sodium chloride to produce chlorine, hydrogen and sodium hydroxide, but it will be understood that the apparatus and process described herein may be used in other electrolysis processes such as the electrolysis of aqueous solutions of other alkali metal halides, the production of chorates or perchlorates, for the electrolysis of water, for the electrolysis of sulfates and the electrolysis of other solutions to produce electrolysis products for organic oxidation and reduction and for other processes.

The invention uses dimensionally stable anodes comprising a valve metal base of, for example, titanium or tantalum or alloys thereof, which is resistant to cell conditions and which is provided with an electrically conductive electrocatalytic coating of one or more oxides of platinum group metals with other protective oxides, such as oxides of titanium or other metals, or with a coating of platinum group metals in metallic form on the anode, or other forms of electrically conducting electrocatalytic coatings.

These dimensionally stable anodes may be in screen, mesh, expanded mesh, rod, perforated plate or other open forms having more than 50% voids as compared with the solid portions of the anodes, so that chlorine or other gas bubbles formed at the anodes may readily pass along or through the horizontally mounted anode screens and escape through the anode mesh or screens, so that gas blanketing of the anodes and the discharge of gases from the anode waves mounted in horizontal position presents no problem, or the anodes may be in horizontally mounted blade form. These dimensionally stable metal anodes may give several years of service without renewal, whereas graphite anodes as used in the past require renewal about every six months because of the gradual wearing away of the graphite under electrolysis cell conditions.

With dimensionally stable anodes, it is desirable to make the anode area as large as possible and to provide a correspondingly large cathode area in as small a cell frame as possible. However, when dimensionally stable anodes in wave form are used with blades of the anode and cathode waves in vertical position, the height of the anode and cathode blades are limited to approximately 3 to 4 feet because of the accumulation of upwardly rising chloride bubbles in the fairly narrow electrolysis gap between the diaphragm covered cathode surfaces and the anode surfaces, which bubble accumulation causes a voltage drop in the brine toward the top of the electrolysis gap, greater than can be tolerated for economical production of chlorine or other gas. The large accumulation of chlorine bubbles in the brine toward the top of the electrolysis gap between vertically mounted anode and cathode blades also produces foam in this gap and interferes with the separation of chloride gas from the brine. These conditions limit the practical height of electrolysis cells using vertical mounted dimensionally stable anode and cathode blades and, therefore, limit the size to which these cells can be built.

One of the objects of this invention is to provide electrolysis cells using dimensionally stable anodes in which the active faces of the anode blades and those of the corresponding cathode waves, are in vertical position, but the waves of the anodes and those of the cathode run horizontally or essentially horizontally, whereby the length of the cathode waves in horizontal position is not limited by the above described gas accumulation in the upper portion of the electrolysis gap.

Another object of this invention is to provide electrolysis cell units with dimensionally stable anodes in single or double blade form and cathodes in wave form, mounted in horizontal position or slightly inclined to the horizontal which can be mounted in bipolar connection with similar cell units in essentially vertical stacks of unlimited height without increasing the length of the path of the gas bubbles in the anolyte liquor.

Another object of the invention is to improve the electrical contact between the elements or cell units of a bipolar cell.

Another object of the invention is to provide a bipolar diaphragm electrolysis cell which consists of a series of substantially horizontal anode and cathode frame members, stacked one on top of the other with the anode frame members providing insulation between the cathode frames and with anode blades and cathode waves mounted substantially horizontally in the frame members, whereby assembly and disassembly of the cell is facilitated.

Another object of the invention is to provide a stacked bipolar diaphragm electrolysis cell, which will occupy small floor space with reference to its capacity.

Various other objects and advantages of this invention will appear as this description proceeds.

Referring now to the drawings, which illustrate various embodiments of the invention:

FIG. 1 is a side elevation of a vertically stacked, fifteen unit vertical bipolar diaphragm cell with dimensionally stable blade anodes and cathodes in wave form with the waves running in a horizontal plane;

FIG. 2 is an enlarged part sectional plan view substantially along the line 2—2 of FIG. 3;

FIG. 3 is a longitudinal sectional view of a three unit bipolar diaphragm cell with dimensionally stable blade anodes and cathodes in horizintal wave form, along the line 3—3 of FIG. 2;

FIGS. 6 and 6a are enlarged part sectional views of two anode double blades and two cathode waves of a cell unit, in which FIG. 6a is taken at a right angle to FIG. 6;

FIG. 7 is a part cross sectional view of one of the brine containers and brine feeding means substantially along the line 7—7 of FIG. 2, and FIG. 7a is a detail view along the line 7a—7a of FIG. 7;

FIG. 8 is a part sectional side view of two of the catholyte outlets of a three unit bipolar cell and FIG. 8a is a detail of the adjustable catholyte outlet;

FIG. 9 is a plan view of another embodiment, showing six horizontal anode and cathode wave banks mounted in one cell frame;

FIG. 10 is a sectional view substantially along the line 10—10 of FIG. 9;

FIG. 11 is a longitudinal section, substantially along the line 11—11 of FIG. 9.

Figure 4:
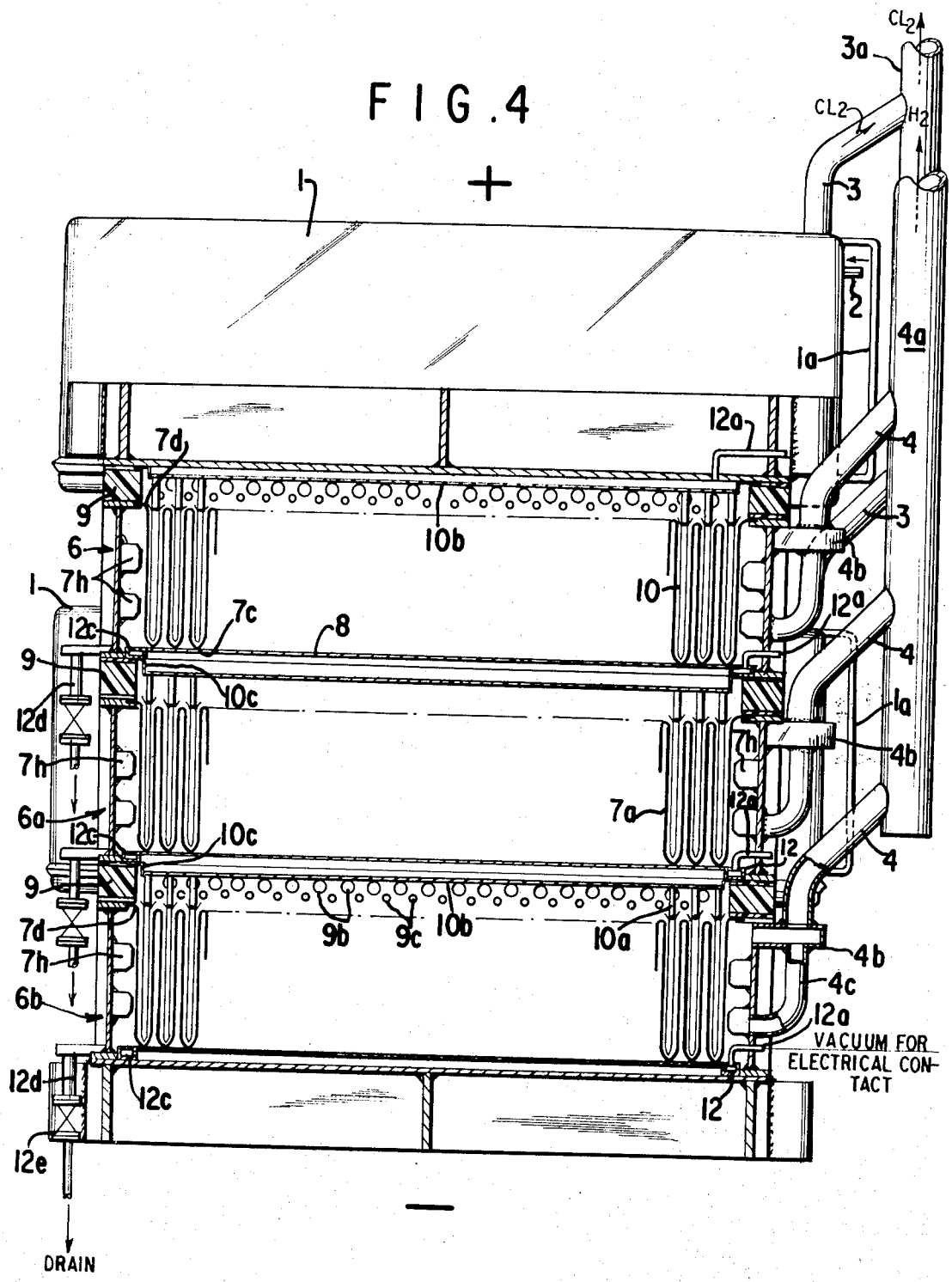
FIG. 4 is a transverse sectional view of a three unit cell along the line 4—4 of FIG. 2, taken essentially at a right angle to FIG. 3.

In the embodiment illustrated in FIG. 1, a bipolar cell stack A consisting of fifteen stacked bipolar cell units B, B, B, etc. is shown. The bipolar cells of this invention may contain from ten to twenty or more cell units. Brine is fed into the anode compartment of each cell unit B through one side of a glass fiber reinforced polyester insulating frame or a high temperature polyvinyl chloride frame (PVC) 9 (FIG. 3), from polyester or high temperature PVC brine containers 1, mounted alternately on two of the four sides of the cell stack A. Brine is fed to each of the brine containers 1 from brine inlets 2 (FIG. 2), fed from a common brine feed pipe with controlled feeding by means of valves and flow meters (not shown), and is fed from the brine containers 1 into the individual anodic compartments of cell units B, B, etc. In operation, chlorine produced in each cell unit B flows into the connected brine container 1 where it bubbles through the brine and escapes from the brine containers 1 through outlets 3 and into a common chlorine discharge line 3a on two of the sides of the cell stack A, leading to the chlorine recovery system. Hydrogen produced in the cathode compartment flows through hydrogen outlets 4 and into hydrogen discharge line 4a, leading to the hydrogen recovery system, and catholyte liquor (NaOH) produced in the cathode compartment flows through the catholyte outlets 5 to the catholyte discharge line 5a.

Figure 5:
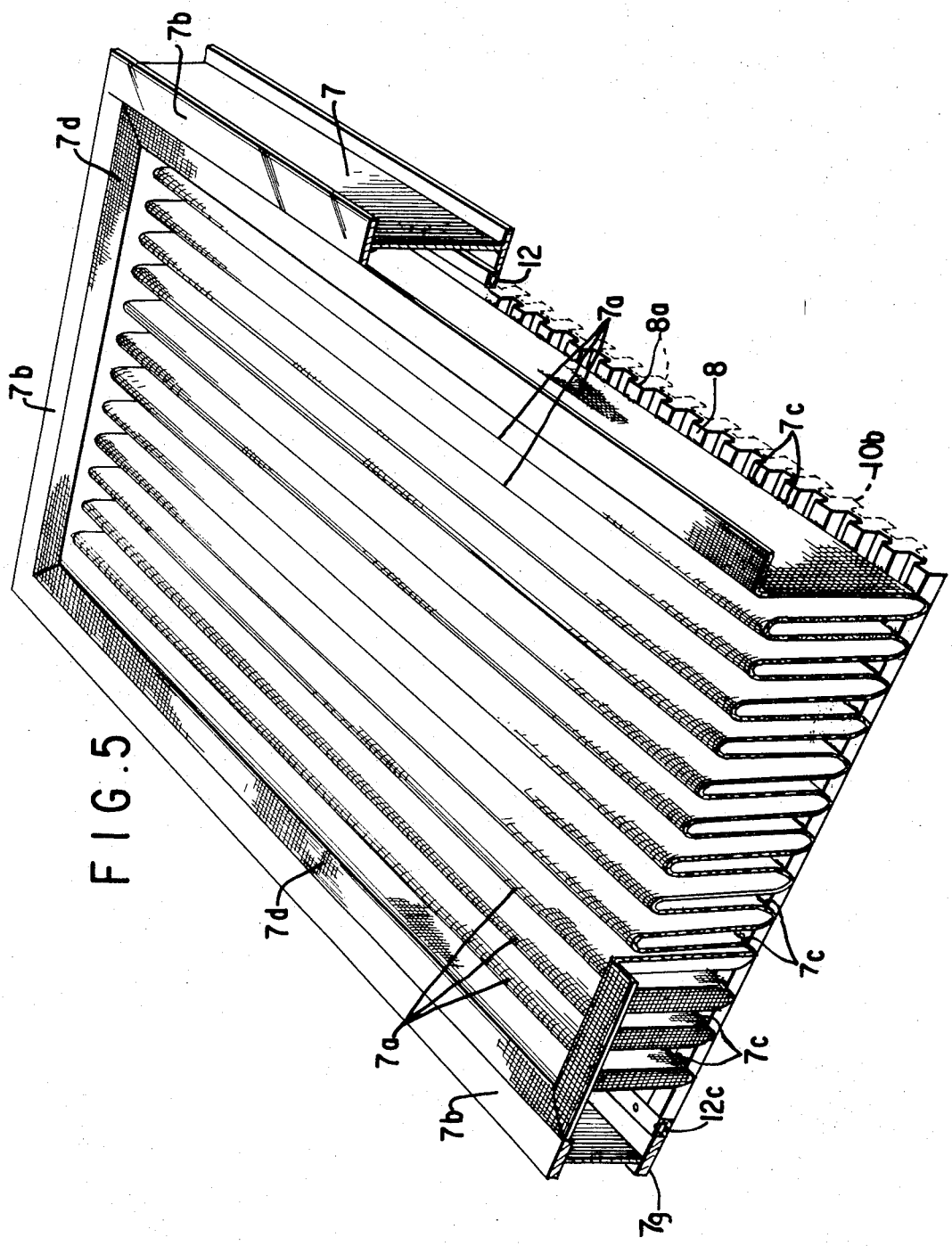
FIG. 5 is a persepective view of the cathode frame and cathode screen waves of one cell unit, showing the cathode waves running up and down in a horizontal plane.

Referring now to FIGS. 3, 4 and 5, each cell unit 6, 6a, 6b, etc. consists of a ferrous metal (steel) cathode frame 7 in which the cathode screen 7a (FIG. 5) is mounted horizontally in wave form. The cathode screen waves 7a are welded to the frame 7 around the inner perimeter of its flange 7b and the trough of each wave of the cathode screen is welded at 7c to a thin steel bottom plate 8 having rectangular corrugations or bumps 8a therein. A rectangular insulating anode frame 9 of glass fiber reinformed polyester or similar electrically insulating and chemically resistant material is mounted on the top of each flange 7b and on the sides 9a where the brine containers 1 are mounted, one side of the polyester or PVC frames is provided with a row of large holes 9b (FIGS. 3, 4, 7 and 7a) for the discharge of chlorine gas from the anodic compartments into the brine containers 1, and a row of smaller holes 9c through which brine is fed from the polyester or PVC brine containers 1 into the anode compartment of each cell unit as shown in greater detail in FIGS. 7 and 7a.

The brine from containers 1 is fed below a shelf 9d in the containers through the brine feed holes 9c (FIGS. 7 and 7a) into the anodic compartments and the brine level in the anodic compartments is maintained at the level necessary to maintain the desired flow through the diaphragms 7e on cathode waves 7a. The permeability of these diaphragms gradually lessens the longer the diacatholyte liquor, the decrease in permeability of the diaindicator 1a for each brine feed container 1, rises continually during the life of the diaphragms. By maintaining a brine feed to each container 1, adjusted for the production of an essentially constant caustic concentration in the catholyte liquor, the drecrease in permeability of the diaphragms is compensated for. The space above the brine level in the anodic compartments is occupied by chlorine gas which flows through the larger holes 9b in the sides 9a of the polyester of PVC frames 9 and flows upwardly through the brine in containers 1 and through the chlorine outlets 3 to the chlorine discharge lines 3a, which are located behind the $H_2$ discharge header 4a in FIG. 4.

In the anodic compartments, valve metal anodes 10 in vertical double or single blade form extend from end to end and side to side of the cathode frames 7 (FIG. 5), and are fitted between each of the cathode waves 7a and each anode blade 10 is welded, bolted or otherwise secured to horizontally mounted titanium connecting strips 10a which are welded or otherwise secured to a corrugated titanium back plate 10b, whose corrugations or bumps make contact with the corrugations 8a of the adjacent steel cathode bottom plate 8 of the next higher cell. While the anodes 10 have been described as in single or double blade form, it will be understood that single blades of titanium coated with an electrically conducting electro-catalytic coating may be used, with each blade fitting between the cathode waves 7a. The ends 10c of the back plates 10b fit between the top of the polyester or PVC frames 9 and the bottom flanges of the next higher cathode frame 7, suitable gaskets being provided to make these joints liquid and gas tight. The ends 7d of the cathode screens 7a fit between the top of flanges 7b of cathode frame 7 and the next higher polyester or PVC frame 9 and suitable gaskets are provided to make these joints fluid tight. The cathode screen waves 7a are provided with diaphragms by depositing asbestos fiber or other diaphragm material 7e (FIG. 6a) on the cathode screens by means of suction nozzles 7f provided in each cathode frame for that purpose.

The cell units B, B, B, etc. are held together by nuts 11c on a series of long bolts 11 extending from the top plate 11a to the bottom plate 11b (FIG. 3) and positive and negative electrical connections are made with the top and bottom plates. The bipolar connection between each cell unit B and the next lower cell unit is made by the weight of the cell units or by bolting, welding or preferably by a vacuum maintained contact between the bottoms of corrugations or bumps 8a in the steel plates and the tops of corrugations or bumps in the titanium back plates 10b. The corrugated titanium back plates 10b are between 1 and 3 mm. thick, preferably approximately 1.5 mm. thick and the corrugated steel plates 8 are also between 1 and 3 mm. thick, preferably approximately 1.5 mm. thick, so that there is a certain flexibility in these plates. Instead of corrugated steel plates 8, flat steel plates about 10 to 15 mm. thick, having grooves or channels 11d machined in their lower face, may be used, similar to the top plate 11a (FIG. 3). The corrugations of the top titanium back plate 10b make contact with the top plate 11a and the corrugations 8a of the bottom steel base plates make contact with the bottom plate 11b, which contacts are maintained by the vacuum into the squared tubes 12.

Prior to assembly, one or both of the contact faces of the corrugations are sandblasted and covered with a film of sprayed soft metal such as copper, silver, lead or alloys thereof. The long bolts 11 hold the cell elements together, but during operation of the bipolar cell a vacuum may be applied to the space between the steel and titanium plates 8 and 10b by means of square tubes 12 which communicate with the space between these contact plates and with vacuum lines 12a (FIGS. 4 and 6a) connected to vacuum header line 12b (FIG. 1) and to a vacuum pump system (not shown). Suitable gaskets around the perimeter of the corrugated anodic and cathodic plates seal the edges of these plates and permit maintaining the vacuum bipolar connection with little expenditure of power. A vacuum of approximately 700 mm. of mercury is usually sufficient for this purpose. A squared tube 12c on the side opposite vacuum tube 12 in FIG. 4 communicates with the bottom of each cathode compartment and with drain lines 12d and drain valves 12e, so that each of the catholyte compartments can be drained during shut-downs.

The anodes 10 are formed of thin sheets (approximately 1–2 mm.) of a valve metal, resistant to the cell conditions, such as titanium or tantalum or alloys of titanium or tantalum having a conductive electrocatalytic coating containing a mixture of oxides of titanium or tantalum and oxides of a platinum group metal, or oxides of other metals, or the anode faces may be covered with a platinum group metal in metallic form, or any other electrically conducting electrocatalytic coating may be used. The anodes 10 may be in the form of mesh, screen, expanded mesh, perforated plates, rods, solid titanium sheets, reticulated titanium sheets, or the like or similar tantalum sheets, and may be coated on either or both the front and back face of the anode with said electrically conducting electrocatalytic coating. The preferred method of applying the coating is by chemi-deposition in the form of solutions painted, dipped or sprayed on or applied as curtain or electrostatic spray coatings, baked on the anode base or by electroplating if platinum group metal coatings are used. The active faces of anodes 10 are spaced about 6 to 10 mm. from the cathode screen waves 7a and diaphragms 7e, and the anolyte liquor is maintained at a level above the top of the anode blades to provide efficient electrolysis of the anolyte liquor in the electrode gap between the blades of anodes 10 and the diaphragm material on the cathode screen waves 7a.

The hydrogen released in the cathode compartments flows out through hydrogen outlet boxes 4b which communicate with the cathode compartment near the top thereof, into the hydrogen outlets 4 and into hydrogen discharge header 4a (FIG. 4). In the hydrogen outlet boxes 4b, the hydrogen has room to separate from the catholyte liquor and foam and the catholyte liquor recirculates through the lines 4c adjacent the bottom of the cathode chambers to the outlet boxes 4b and back into the cathode chambers.

The catholyte liquor, which in the electrolysis of sodium chloride is a dilute solution of NaOH (about 11 to 12%), and depleted brine flows from near the bottom of each cathode frame 7 through adjustable gooseneck catholyte outlets 5 into the catholyte header 5a (FIG. 8). The approximate catholyte level is indicated by the line C—C in FIG. 8, and the approximate anolyte level by the line D—D. The gooseneck catholyte outlets 5 are adjustable by pivoting around the outlet pipe 5b and are fixed in the position of adjustment which maintains the correct catholyte level in the catholyte compartments. As described above, the brine level is adjusted automatically or by hand, to maintain the required flow through the diaphragms to keep the desired NaOH concentration in the catholyte compartments. A vent 5d open to the atmosphere at the top of the goosenecks 5, vents any small amount of hydrogen from the catholyte liquor and prevents syphoning of catholyte liquor from the catholyte compartments. From the down leg 5e of the goosenecks, the catholyte liquor flows into the catholyte outlet header 5a and to the catholyte recovery system. Projections 7h on the walls of the cathode frames 7 prevent collapse or bending of the cathode screen waves 7a during deposition of the diaphragm material 7e under vacuum.

Corrugated sheets are preferably used as back plates 10b for the titanium anodes 10 as well as for the steel base plates 8 to which the steel cathodes 7a are welded because welding on corrugated thin sheets creates practically no warping of the base sheets, while welding on thicker sheets creates warping, which has to be corrected by machining or pressing after the welding, a process whose success depends on an annealing step and on great care, which is difficult to maintain in large scale fabrication.

The corrugated steel plates 8 are welded to the bottom flange 7g of the cathode frames 7 along two sides and on the other two sides they are welded, respectively, to the squared vacuum line 12 and to the squared drain lines 12c.

The welding of the bottom of the cathode waves 7a to the corrugations 8a of the base plates 8 increases the mechanical rigidity of the cathode assembly and welding the anode blades 10 to the corrugated titanium back plates 10b at right angles to the corrugations provides sufficient rigidity to the anode and back plate units to permit handling during assembly or disassembly without mechanical deformation.

Where double titanium anodes are used instead of single blades, as illustrated in FIGS. 3, 4 and 6a, holes 10d near the bottom of the anode (single) waves permit the anolyte to be cycled down the inside of the anode waves, through the holes 10d and up between the anodes and the cathode diaphragms, as indicated by the arrows, so that the chlorine loaded anolyte rises in the electrolysis gap between the cathode diaphragms and the active outside surfaces of the anodes and the chlorine bubbles are released in the gas space above the anolyte and flows out through the chlorine discharge holes 9b while the depleted anolyte together with fresh anolyte flowing into the anode compartments through the holes 9c, is recirculated down the inside of the anode waves and through the holes 10d. This leads to faster elimination of the chlorine bubbles and a lower ohmic resistance of the anolyte resulting in a lower voltage drop in the electrolyzer. Where double titanium anodes are used, one face of the anodes as well as the cathodes may be covered with diaphragm material.

Even where cathode bodies 2 m. or more long are used, no critical chlorine bubble accumulation in the electrolysis gaps takes place, because the bubbles are released from the electrolysis gap along the shortest possible vertical route, into the space above the anolyte, avoiding in this way an increased ohmic resistance of the brine in the electrolysis gap and avoiding the need for an excessively high (and, again, voltage increasing) distance between vertically mounted anode and cathode waves.

The produced chlorine gas bubbles rise into the space underneath the corrugated titanium base plates and leave the anodic compartments through a row of horizontal holes 9b, provided on one side of the polyester of PVC insulating frames 9. These frames 9 are sealed by rubber gaskets on the upper faces to the rim of the corrugated titanium back plate 10b carrying the anodes and on the lower faces to the flanges 7b of the steel cathode boxes.

The mixture of chlorine gas and any entrained anolyte enters the glass fiber reinforced polyester or PVC brine containers 1, located on one side of each electrolyzer element. In these containers, the chlorine bubbles separate from the entrained anolyte and flow to the chlorine recovery system while horizontal zig-zag shaped separation plates 9d, made of polyester or PVC, between the row of large holes 9b and the row of small holes 9c facilitates separation of the chlorine gas (containing some entrained anolyte) and the feed brine to the anolyte compartments.

The brine containers 1 are provided with sufficient horizontal cross section, so that even at the lowest brine level, the feed brine quantity is sufficient for an emergency brine supply to the corresponding cell during a period of brine feed interruption, in this way the electrolyzer is saved from being shut down in such a case if the interruption does not last more than about 10 minutes.

In the embodiment illustrated in FIGS. 9, 10 and 11, six horizontally mounted anode and cathode wave banks are mounted in a single cathode frame 7i. The construction and operation of this embodiment is substantially similar to the embodiments of FIGS. 1 to 8.

In the modification of FIGS. 9, 10 and 11, brine is fed into the anode compartment of each cell unit B, B through one side of a polyester of PVC insulating frame 9, from the brine container 1, mounted alternately on one of two sides of the cell stack A of FIG. 11. Brine is fed to each of the brine containers 1 from brine inlets 2, fed from a common brine feed pipe with controlled feeding by means of valves and flow meters, and is fed from the brine containers 1 into the individual anodic compartments of cell units B, etc. The brine flows below the shelf 9d in the brine containers on the left side of FIG. 11, through holes 9c into the anodic compartment on the top left side of FIG. 11 and when this compartment is filled, flows through holes 9c in the center of the top tier into the anodic compartment on the top right side of FIG. 11. Chlorine produced in the top right anodic compartment of FIG. 11 flows through the center opening 9b, into the top left anodic compartment and thence through the opening 9b at the top left side of FIG. 11, into the top brine container 1 on the left side of FIG. 11. The flow of chlorine through the center opening 9b and the left-hand opening 9b is indicated by arrows in openings 9b. In a similar manner, the right and left anodic compartments in the second tier are filled with brine from the brine container on the right side of FIG. 11 and chlorine gas flows from both the right and left anodic compartments, through the openings in the center separator of frame 7i, into the brine container shown on the right side of FIG. 11. Chlorine produced in each cell unit B flows into the connected brine container 1 where it bubbles through the brine and escapes from the brine containers 1 through outlets 3 and into a common chlorine discharge line 3a on its corresponding side of the cell stack A, leading to the chlorine recovery system. Hydrogen produced in the cathode compartment flows through hydrogen outlets 4 and into hydrogen discharge line 4a, leading to the hydrogen recovery system, and catholyte liquor (NaOH) provided in the cathode compartment flows through the catholyte outlets 5 to the catholyte discharge line 5a.

Each cell unit B, B, etc. consists of a ferrous metal (steel) cathode frame 7i holding six anode and cathode wave banks, in each of which the cathode screens 7a are mounted in horizontal wave form with the anode blades 10 between each wave. The anode blades may be single blades of titanium or double blades as illustrated in FIGS. 6a and 10. The cathode screen waves 7a are welded to the frame 7i around the inner perimeter of its flange 7j and the trough of each wave of the cathode screen is welded at 7c to a thin corrugated steel bottom plate 8 having rectangular corrugations or bumps 8a therein. A rectangular insulating anode frame 9 of glass fiber reinforced polyester, PVC or similar insulating material is mounted on the top of each flange 7j and on the sides 9a, where the brine containers 1 are mounted, side frames are provided with a row of large holes 9b for the discharge of chlorine gas from the anodic compartments into the brine containers 1, and a row of smaller holes 9c through which brine is fed from the brine containers 1 into the anode compartments.

The brine from containers 1 is fed below a shelf 9d in the containers through the brine feed holes 9c into the anodic compartments and the brine level in the anodic compartments is kept automatically at the level necessary to maintain the desired flow through the diaphragms on cathode waves 7a. A certain space above the brine level in the anodic compartments, established by the limited speed of chlorine release, is occupied by chlorine gas which flows through the larger holes 9b in the sides 9a of the frames 9 and flows upwardly through the brine in containers 1 and through the chlorine outlets 3 to the chlorine discharge lines 3a.

In the anodic compartments, valve metal anodes 10 in horizontal blade form, which extend from end to end and side to side of each of the six compartments in the frames 7i are fitted between each of the cathode waves 7a and each anode blade 10 is welded, bolted or otherwise secured to titanium connecting strips 10a which are welded or otherwise secured to a corrugated titanium back plate 10b whose corrugations or bumps make contact with the corrugations 8a of the steel cathode plate 8.

While the anodes 10 have sometimes been described as in wave form, it will be understood that single blades of titanium coated with an electrically conducting electrocatalytic coating may be used with each blade fitting between the cathode waves 7a. The ends 10c of the back plates 10b fit between the top of the insulating frames 9 and the bottom flanges of the next higher cathode frame 7i, suitable gaskets being provided to make these joints liquid and gas tight. The ends 7d of the cathode screens 7a fit between the top of flanges 7j of cathode frames 7i and the next higher insulating frame 9 and suitable gaskets are provided to make these joints fluid tight. The cathode screen waves 7a are provided with diaphragms by depositing asbestos fiber or other diaphragm material 7e (FIG. 6a) on the cathode screens by means of suction nozzles 7f provided in each cathode frame for that purpose.

The cell units in the embodiment of FIGS. 9, 10 and 11 are held together by long bolts and nuts as in FIG. 3 and positive and negative electrical connections are made with the top and bottom plates. The bipolar connection between each cell unit B and the next lower cell unit is made by bolting, welding or preferably by a vacuum maintained contact between the bottoms of corrugations or bumps 8a in the steel plates and the top of corrugations or bumps in the titanium back plates 10b as in the embodiment of FIGS. 3 and 4.

The hydrogen released in the cathode compartments flows out through hydrogen outlet boxes 4b (FIG. 9) which communicate with the cathode compartments near the top thereof, into the hydrogen outlets 4 and into hydrogen discharge header 4a (FIG. 9). In the hydrogen outlet boxes 4b, the hydrogen has room to separate from the catholyte liquor which recirculates through the lines 4c adjacent the bottom of cathode chambers to the outlet boxes 4b and back into the cathode chambers. Spacers 7h on the outer walls and the inside partitions of the multi-compartmented frames 7i of the embodiment of FIGS. 9, 10 and 11 prevent collapse or excessive bending of the cathode screen waves 7a during vacuum deposition of the diaphragm material on the cathode waves.

While the cell units of FIGS. 1 to 11 are preferably mounted substantially horizontally, they may be mounted at any desired inclination at which they will operate, such as between 5° to 30° from the horizontal.

While several embodiments of the invention have been described, it will be understood that other embodiments may be used, that the horizontal frame unit may be mounted at an angle to the horizontal and that variations may be made in the embodiments illustrated without departing from the spirit and scope of this invention.

What is claimed is:

1. In a diaphragm cell electrolyzer for brine solutions, a substantially horizontal ferrous metal cathode frame, a flange around said cathode frame, a metal cathode screen in wave form mounted substantially horizontally in said cathode frame, a metal bottom plate for said cathodic frame, to which said cathode screen waves are electrically connected, an insulating anode frame mounted on the flange on said metal cathode frame, a valve metal back plate mounted on said anode frame, valve metal anode blades electrically connected to said valve metal back plate and projecting into said cathode screen waves to form an electrode gap therewith, an electric conducting electrocatalytic coating on said anode blades, a diaphragm on said cathode screen waves, an anodic gas outlet in said insulating anode frame, a brine feed inlet into said insulating anode frame, a cathodic gas outlet and a catholyte liquor outlet in said cathode frame, a positive electrical connection to said valve metal back plate and a negative electrical connection to said cathode bottom plate.

2. The cell of claim 1, in which the anode blades are reticulated, expanded titanium having an electrically conducting electrocatalytic coating thereon.

3. The cell of claim 1, in which the valve metal anode blades are double sheet metal plates connected together at the bottom and formed to provide a space between the plates, with holes in said plates toward the bottom of said space, whereby an electrolyte can be circulated down the inside of said plates, through said holes and up the outside of said plates.

4. The cell of claim 1, in which the cathode frame has adjustable means for discharging the cathode liquor and separate means for discharging the cathode gas.

5. The cell of claim 1, in which one side of said insulating anode frame is provided with small holes toward the bottom of said anode frame for the feeding of a brine solution into said anode frame and with larger holes above said small holes for the release of anodic gas from said anode frame.

6. The cell of claim 5, in which said holes are connected with brine containers for feeding brine into and receiving gas from inside said anode frames and for separating the gas from the brine in said containers.

7. The cell of claim 1, in which a plurality of said cell units are mounted one on top of the other, positive electrical connections are provided for the top unit, negative electrical connections are provided for the bottom unit and bipolar electrical connections are provided between said cell units.

8. The cell of claim 7, in which an anodic gas release space extends for the width of each cell unit above the level of the anode blades and below the valve metal back plate.

9. The cell of claim 7, in which the cell units are held together by long bolts and by the weight of the units.

10. The cell of claim 7, in which the cell is mounted with the cell units at an angle of about 5° to 30° from the horizontal.

11. The cell of claim 7, in which the bipolar electrical connection between the cell units is maintained by the weight of the cell units.

12. The cell of claim 7, in which the bipolar connections are between the bottom plate of a cathode frame and the valve metal back plate of the anode blades.

13. The cell of claim 12, in which the bottom plates of each cathode frame have corrugations therein, the valve metal back plates are corrugated and the meeting faces of the respective corrugations of each of said plates are held in electrical contact with each other by vacuum.

14. The cell of claim 13, in which said corrugations are substantially rectangular and the meeting faces are covered with a soft metal.

15. The cell of claim 14, in which the soft metal is from the group consisting of copper, silver, lead, tin, aluminum and alloys of copper, silver, lead, tin and aluminum.

16. The cell of claim 12, in which the bottom plates and the valve metal back plate are approximately 1 to 3 mm. thick, the anodes are welded to the valve metal back plates and the cathode waves are welded to the steel bottom plates.

17. The cell of claim 16, in which the bottom plates, anode plates and the valve metal back plates are corrugated, the anodes are connected to the back plates at right angles to said corrugations and the cathode waves are welded to the bottom plates at right angles to the corrugations.

18. The cell of claim 17, in which the bumps of the corrugated bottom plates and the corresponding bumps of the corrugated valve metal back plates are held together in electrical contact by means of vacuum.

19. In a diaphragm cell electrolyzer for brine solutions, a plurality of substantially horizontal bipolar cell units each comprising a rectangular steel frame, a rectangular insulating member between the steel frames, steel cathode waves mounted in the steel frames, valve metal anode blades between the steel cathode waves, an anodic gas outlet in each of said insulating members, a brine feed inlet in each of said insulating members, a cathodic gas outlet and a catholyte liquor outlet in each of said rectangular steel frames, an electrically conducting electrocatalytic coating on said valve metal anode blades, and bipolar connections between said cell units.

20. The electrolyzer of claim 19, in which the said frame and insulating members are mounted at an angle of 5° to 30° from the horizontal.

References Cited

UNITED STATES PATENTS

| | | | |
|---|---|---|---|
| 1,485,461 | 3/1924 | Knowles | 204—256 |
| 3,563,878 | 2/1971 | Grotheer | 204—256 |
| 3,535,223 | 10/1970 | Baecklund et al. | 204—278 |

FOREIGN PATENTS

| | | | |
|---|---|---|---|
| 1,125,493 | 8/1968 | Great Britain | 204—266 |
| 467,992 | 9/1950 | Canada | 204—256 |

JOHN H. MACK, Primary Examiner

W. I. SOLOMON, Assistant Examiner

U.S. Cl. X.R.

204—98, 254, 255, 266